United States Patent [19]

Bardaville

[11] Patent Number: 5,187,853
[45] Date of Patent: Feb. 23, 1993

[54] ELECTRICAL JUNCTION AND SWITCH BOXES

[76] Inventor: George A. Bardaville, 3201 Townline Rd., Traverse City, Mich. 49684

[21] Appl. No.: 898,325

[22] Filed: Jun. 15, 1992

Related U.S. Application Data

[62] Division of Ser. No. 640,286, Jan. 11, 1991, Pat. No. 5,143,238.

[51] Int. Cl.⁵ .............................................. B23Q 17/00
[52] U.S. Cl. ...................................... 29/407; 33/528; 220/3.2
[58] Field of Search .............. 52/745, 221, 126.2; 29/428, 525, 406, 407; 220/3.2, 3.4, 3.9, 3.92; 33/528, 666, 669, 671, 644, DIG. 10

[56] References Cited

U.S. PATENT DOCUMENTS

| | | | |
|---|---|---|---|
| 1,441,054 | 1/1923 | Barry | 220/3.2 |
| 1,824,571 | 9/1931 | Richardson | 52/221 |
| 2,129,442 | 9/1938 | Pehlke | 220/3.92 X |
| 2,297,139 | 9/1942 | Flachbarth | 52/221 |
| 2,775,812 | 1/1957 | Mohr | 29/407 |
| 3,884,280 | 5/1975 | Chailer | 33/DIG. 10 X |
| 4,096,964 | 6/1978 | Glick | 29/406 X |
| 4,335,511 | 6/1982 | Bowling | 33/DIG. 10 X |
| 4,342,145 | 8/1982 | Kotchy | 29/407 |
| 4,384,396 | 5/1983 | Smolik | 29/407 |
| 4,388,890 | 6/1983 | Wester et al. | 33/DIG. 10 X |

Primary Examiner—Timothy V. Eley
Assistant Examiner—C. Richard Martin
Attorney, Agent, or Firm—Lon H. Romanski

[57] ABSTRACT

An electrical service box is shown as having a main body formed of longitudinally extending body portions of generally cylindrical outer surfaces whereby the main body is capable of being slidably received in a mounting hole having a periphery which at least closely approaches the cross-sectional configuration of such outer surfaces.

8 Claims, 7 Drawing Sheets

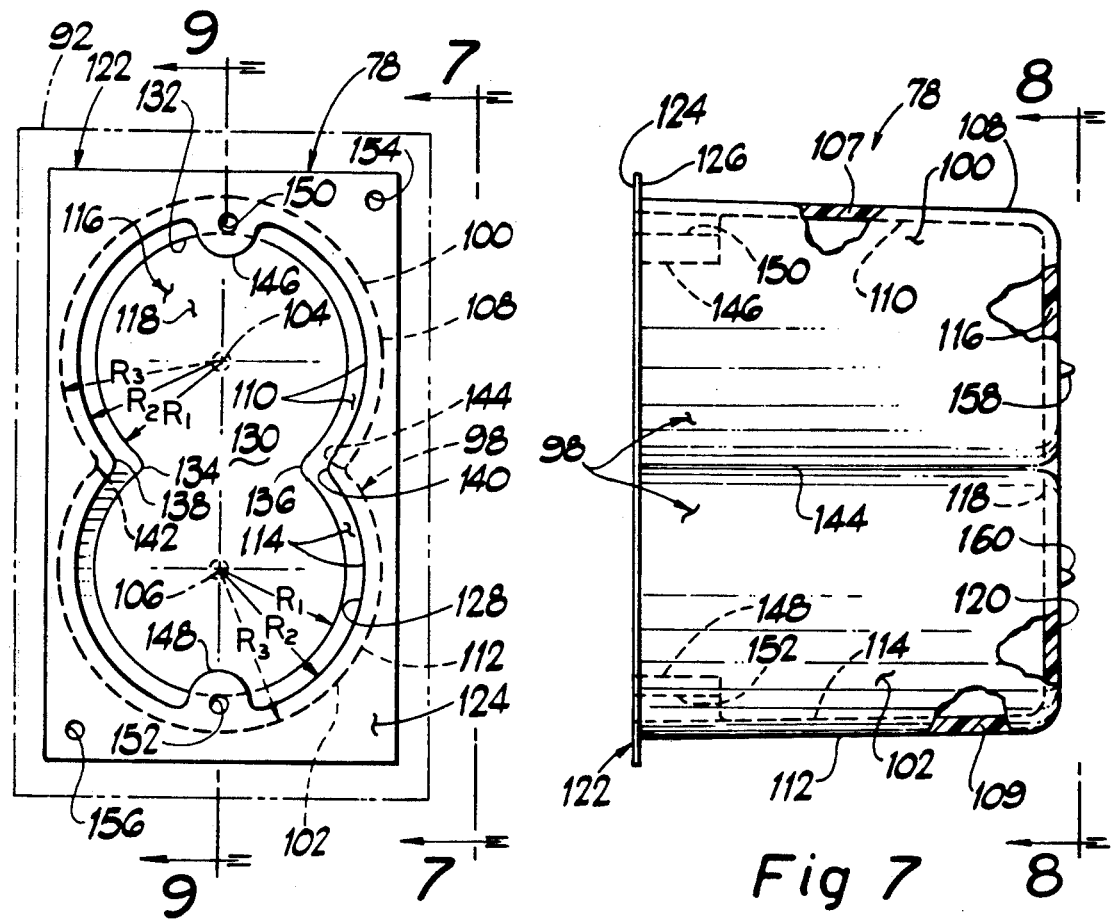
Fig 6
Fig 7
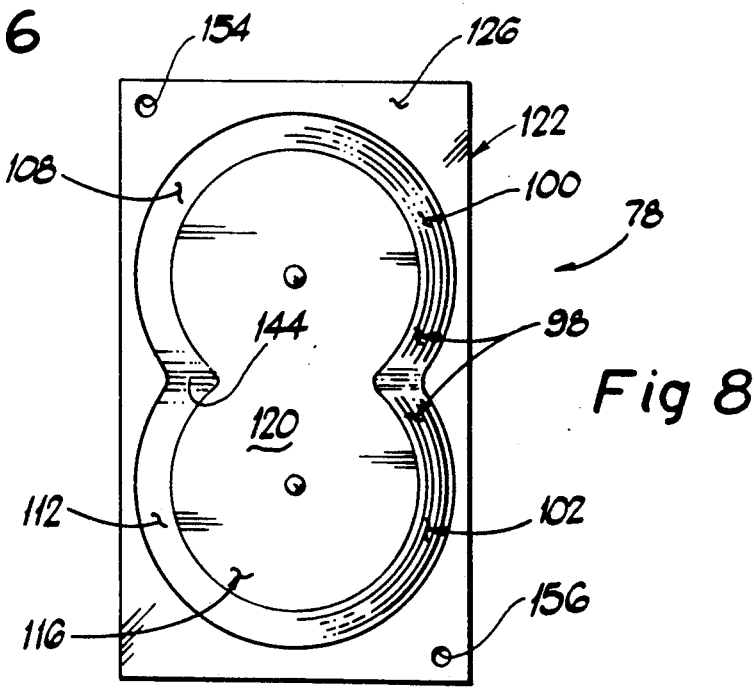
Fig 8

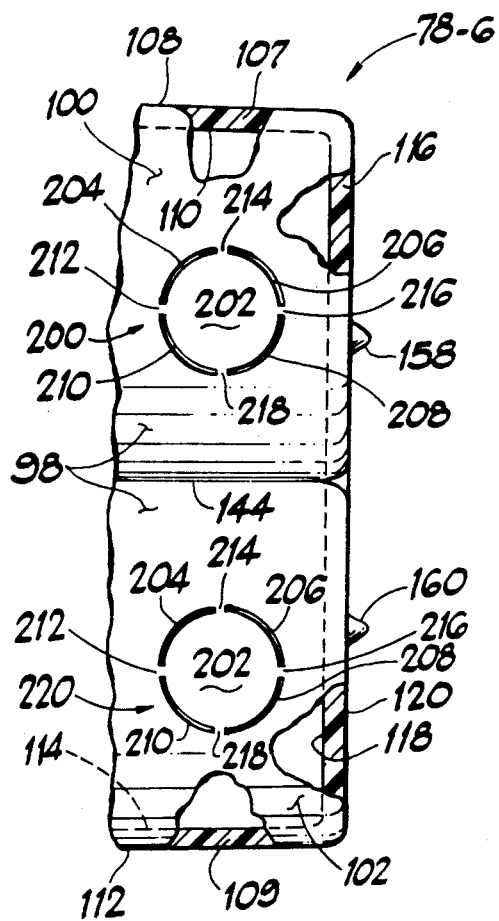
Fig 18
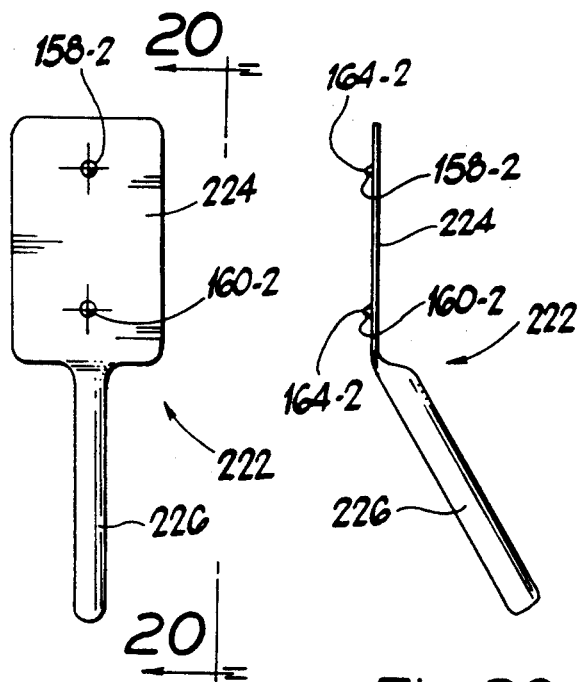
Fig 19
Fig 20
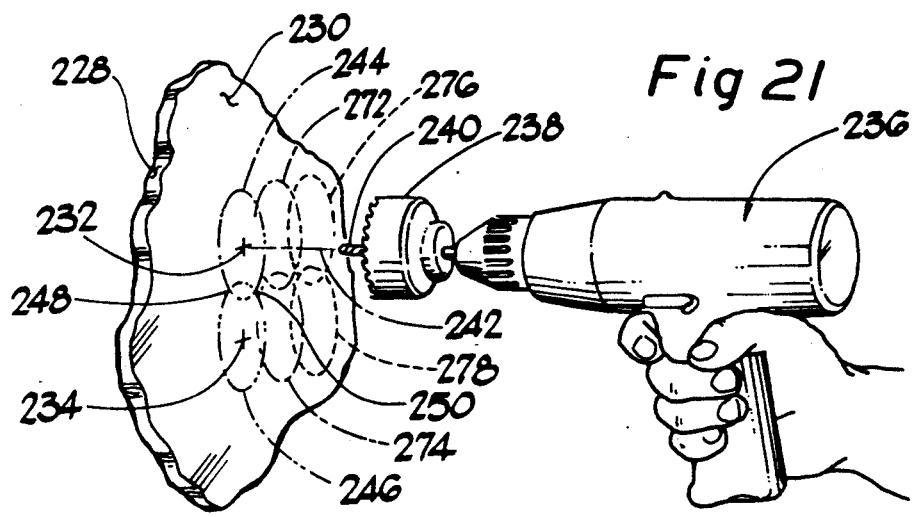
Fig 21

ELECTRICAL JUNCTION AND SWITCH BOXES

RELATED APPLICATION

This application is a Division of my copending application Ser. No. 07/640,286 filed Jan. 11, 1991, now U.S. Pat. No. 5,143,238, for "Electrical Junction and Switch Boxes".

FIELD OF THE INVENTION

This invention relates generally to boxes for completing electrical junctions, as for example, with electrical outlet assemblies and/or electrical switch assemblies generally carried therein and more particularly to electrical boxes employed as a part of a retrofit.

BACKGROUND OF THE INVENTION

It is not unusual to have a situation wherein, for example, a home or other structure is already completed and then it is desired to add other electrical outlets and/or switches to such already completed home or other structure. The addition of electrical outlets and/or switches, of course, requires that cooperating electrical boxes or housings also be installed so that such electrical outlet assemblies and/or switch assemblies will be safely contained thereby in order to prevent the creation of hazards, resulting in, for example, a fire arising from an unshielded electrical outlet assembly and/or switch assembly.

Heretofore, according to the prior art, such additional electrical outlets and/or switches were provided by first drilling relatively small pilot-like holes through the wall facing, which may be of wood panel, plaster or other material, and then using a key-hole saw, or the like, start at such pilot-like holes and proceed to cut a box-like opening through the wall. Thereafter, an electrical box is inserted into and generally through the cut box-like opening and suitably secured as to the wall. Following that, the electrical outlet assembly or the electrical switch assembly is generally inserted into and operatively connected to the mounted electrical box.

One of the problems of the prior art apparatus and procedure is that it consumes an excessive amount of time for completing such an installation.

Accordingly, the invention herein disclosed is primarily directed to the solution of the aforestated as well as other related and attendant problems.

SUMMARY OF THE INVENTION

Apparatus

According to one aspect of the invention, an electrical service box mountable in walls and ceilings, comprises a main body, said main body comprising at least first and second body portions, said first body portion comprises a first generally arcuate wall portion, said second body portion comprises a second generally arcuate wall portion, wherein said first and second generally arcuate wall portions are joined to each other at first and second longitudinally extending junctures spaced from each other, end wall means formed generally transverse to said first and second longitudinally extending junctures and to said first and second generally arcuate wall portions and being joined to said first and second generally arcuate wall portions, wherein said first and second generally arcuate wall portions and said end wall means cooperatively define chamber means, wherein said chamber means has an access opening at an end thereof opposite to said end wall means, wherein said access opening and said chamber means are effective for at least the partial reception therein of an associated electrical device, and wherein said first and second longitudinally extending junctures are spaced from each other sufficiently to accommodate therebetween said associated electrical device.

Method

According to another aspect of the invention, a method for installing an electrical service box into a wall facing or the like comprises the steps of forming the electrical service box to have a cross-sectional configuration the outer portion of which at least approaches that of a figure "8" and the inner portion of which defines a chamber for the reception of an associated electrical device, cutting first and second holes through the wall facing so that said first and second holes partially overlap each other thereby creating an opening through said wall facing having a peripheral configuration approaching that of a figure "8", and then inserting the electrical service box into said opening as to have the cross-sectional figure "8" configuration of said service box at least in general registry to the figure "8" peripheral configuration of said opening.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details may be omitted from one or more views:

FIG. 6 is a front elevational view of the electrical box or housing of FIG. 4;

FIG. 7 is a view taken generally on the plane of line 7—7 of FIG. 6 and looking in the direction of the arrows;

FIG. 8 is a view taken generally on the plane of line 8—8 of FIG. 7 as looking in the direction of the arrows;

FIG. 18 is a relatively enlarged fragmentary portion of any of the electrical boxes or housings shown in the preceding Figures and illustrating other contemplated elements thereof;

FIG. 19 is an elevational view of a tool employable in the practice of the invention;

FIG. 20 is an elevational view taken generally on the plane of line 20—20 of FIG. 19 and looking in the direction of the arrows;

FIG. 21 is a view of a fragmentary portion of a wall and of tool means employable in performing a step or steps according to the invention;

DETAILED DESCRIPTION OF THE PREFERRED EMBODIMENTS

To better appreciate the invention, a more detailed consideration of the prior art appears to be in order.

Figure 1:
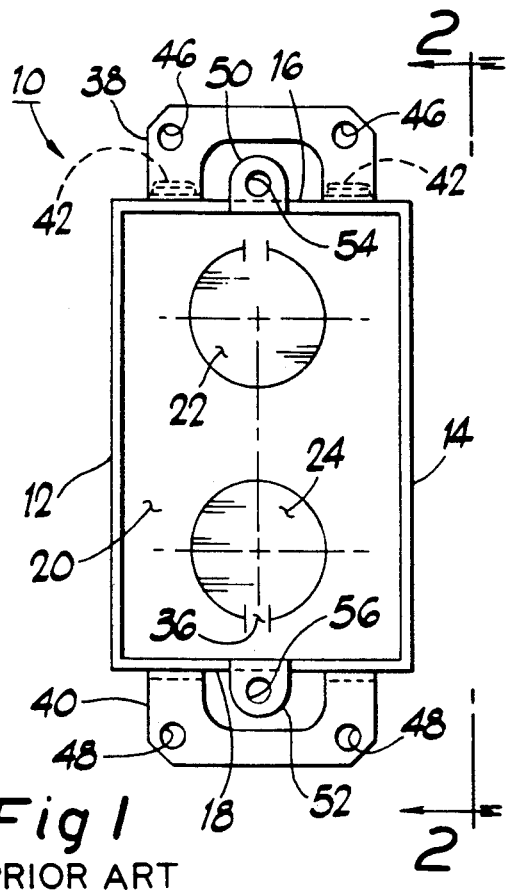
FIG. 1 is a front elevational view of a generally typical prior art electrical box.
Figure 2:
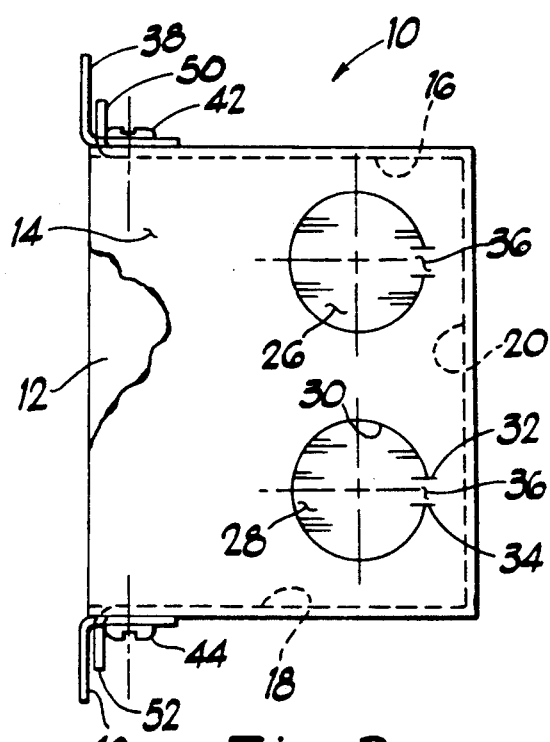
FIG. 2 is a side elevational view taken generally on the plane of line 2—2 of FIG. 1 and looking in the direction of the arrows.
Figure 3:
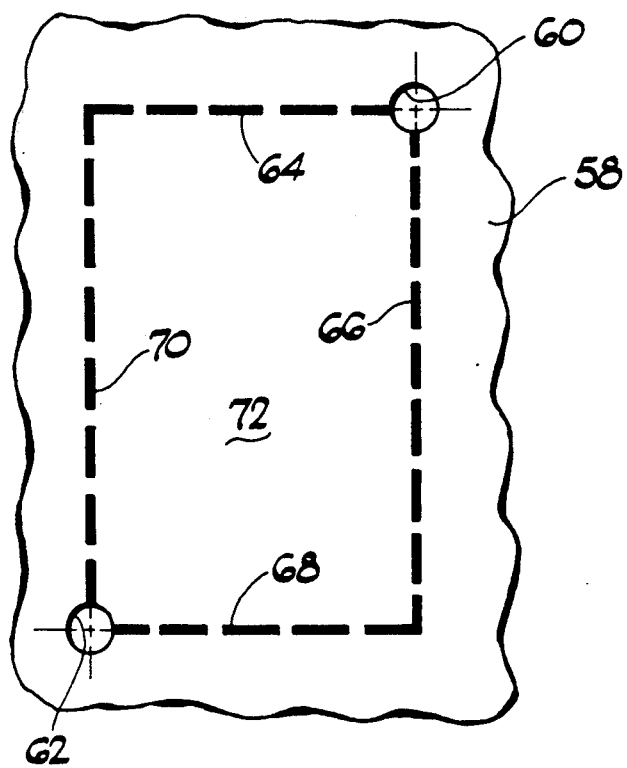
FIG. 3 is an elevational view of a fragmentary portion of a wall into which the prior art electrical box of FIG. 1 is intended to be inserted.

Referring in greater detail to FIGS. 1, 2 and 3, FIG. 1 illustrates a prior art electrical box or housing 10, which may be formed of metal or suitable plastic material, comprising spaced opposed side walls 12 and 14 each joined to spaced upper and lower walls 16 and 18 with all of such walls 12, 14, 16 and 18, in turn, being joined at their respective one ends to a rear wall 20.

It is often accepted practice to provide portions as in the side, rear, upper and lower walls, of the electrical box 10, which are cut-through or pierced, but not removed, so that such may be selectively removed to permit the passage therethrough of associated electrical wiring or conductor means. More particularly, such portions are illustrated at 22 and 24 of rear wall 20 and at 26 and 28 of side wall 14. Each of such portions (sometimes referred to as "knock-out" or "break-out" portions) as typically illustrated by portion 28 may be comprised of a disk-like body defined as by a generally circular cut-through periphery 30 which, in turn, terminates as in respective transverse cut-through sections 32 and 34 thereby defining a relatively narrow connection 36 which maintains the portion 28 generally in the plane of the wall 14. Depending upon the quantity and direction of the electrical wiring to be brought into the box or housing 10, any or all of such portions, as 22, 24, 26 and 28 (as well as others not shown) may be forced inwardly or outwardly thereby providing an opening in the configuration of 30. The connection 36, although not necessarily so, nevertheless is often sufficiently frangible so that as the portion, as 28, is, for example, forced inwardly, the connection 36 breaks thereby releasing such portion 28 from wall 14. Various other forms and types of knock-out or break-out portions are also employed in the prior art.

In the prior art embodiment of FIGS. 1 and 2, generally L-shaped brackets 38 and 40 are respectively secured to the upper wall 16, as by a plurality of screws 42, and to the lower wall 18 as by a plurality of screws 44 one of which is shown in FIG. 2. The extending legs of brackets 38 and 40 are respectively provided with pluralities of holes or openings 46—46 and 48—48 which may be employed for receiving suitable fasteners which engage the related wall structure, or suitable generally horizontal struts as between vertical wall studs, for securing the box or housing 10 to such wall structure.

Still referring to FIGS. 1 and 2, a first generally medial tab 50 is formed from and bent upwardly of upper wall 16 and a second generally medial tab 52 is formed from and bent downwardly of lower wall 18. Tabs 50 and 52 are, in turn, respectively provided with apertures 54 and 56, which are preferably internally threaded, as to enable the threadable securing thereto, of associated electrical outlet means or electrical switch means, as by screw-type fastener means.

Assuming now that, for example, an electrical outlet means were to be added to an already existing wall structure or wall facing means, fragmentarily illustrated at 58 of FIG. 3, employing the prior art structure of, for example, FIGS. 1 and 2 and the established prior art method, two relatively small holes or passages 60 and 62 (the centers of which may be originally located by standard template means) are first drilled through the wall facing 58. As previously indicated, the wall facing may be comprised of wood paneling, plaster or other material.

A key-hole saw or the like is then employed by inserting the saw blade into, for example, hole 60 and then using it to cut through the wall facing 58 generally along the direction depicted by the horizontal heavy dash-line 64. The saw blade is then withdrawn and again inserted into, for example, hole 60 and then used to cut through the wall facing 58 generally along the direction depicted by the vertical heavy dash-line 66. The saw blade is then withdrawn and inserted into hole 62 and then used to cut through the wall facing 58, for example, generally along the direction depicted by the horizontal heavy dash-line 68 until such cut intersects that of the cut along 66. The saw blade is then withdrawn and again inserted into hole 62 and used to cut through the wall facing 58 generally along the direction depicted by the vertical heavy dash-line 70 until such cut intersects that of the cut along 64.

When all four side-cuts, along lines 64, 66, 68 and 70 are thusly completed, the portion 72, of wall facing 58, becomes detached from the wall facing 58 and upon its removal leaves a generally rectangular opening, defined by the edges of the cuts along 64, 66, 68 and 70, for, in turn, receiving therein the electrical box or housing 10. The opening formed in the manner described with reference to FIG. 3, of course, may be square or even horizontally rectangular depending upon the size of the prior art electrical box or housing to be received.

In any event, the prior art method of forming such an opening, as described with regard to FIG. 3, consumes an excessive amount of time and such excessive time consumption is at least related to the configuration of the prior art electrical boxes or housings.

Figure 4:
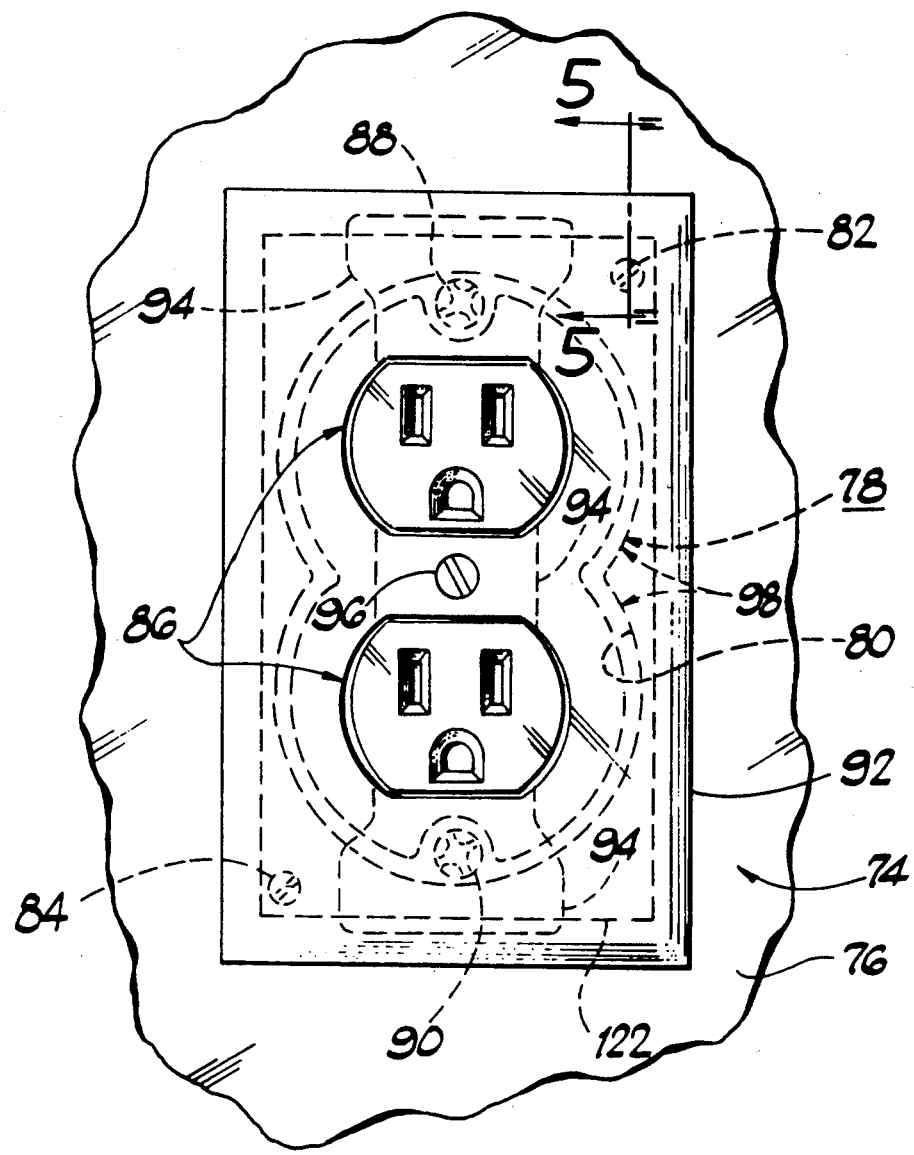
FIG. 4 is a front elevational view of a fragmentary portion of a wall operatively carrying an electrical box or housing, employing teachings of the invention, which, in turn, is shown as operatively carrying an electrical outlet assembly about which a cover plate is operatively carried.
Figure 5:
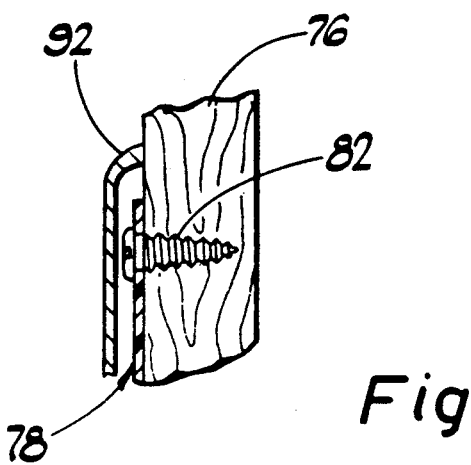
FIG. 5 is a fragmentary cross-sectional view taken generally on the plane of line 5—5 of FIG. 4 and looking in the direction of the arrows.

FIG. 4 illustrates an electrical outlet assembly 74 situated as in a wall facing 76 and employing teachings of the invention. In FIG. 4, the overall assembly 74 is depicted as comprising an electrical box, sometimes referred to as a service box, or housing 78, received as in an opening 80 formed through wall facing 76, which is suitably secured to the wall facing 76 as by screws 82 and 84 and, in turn, carries a double electrical outlet 86, many of which are known in the art, as by securing screws 88 and 90. Finally, a cover plate 92 is shown secured, in this instance to a portion 94 of the structure of the double electrical outlet 86, as by securing screw means 96.

Referring in greater detail to FIGS. 6, 7, 8 and 9, the electrical box or housing 78, employing teachings of the invention, is illustrated as comprising a main body 98 which, in turn, comprises two generally cylindrical body portions 100 and 102 having respective axes 104 and 106.

The generally axially extending wall 107 of body portion 100 is illustrated as having an outer generally cylindrical surface 108 and an inner generally cylindrical surface 110. Similarly, the generally axially extending wall 109 of body portion 102 is illustrated as having an outer generally cylindrical surface 112 and an inner generally cylindrical surface 114. The axially extending walls 107 and 109, in turn, are joined to a rear or end wall 116 having inner and outer end surface means 118 and 120.

In the preferred embodiment, the electrical housing means 78 is molded of suitable plastic material and, therefore, to assist in the removal of the housing means 78 from its molded cavity, body 98 is generally tapered as in the manner depicted in FIGS. 6, 7 and 8. More particularly, the outer cylindrical surface 108 and the inner cylindrical surface 110 become diametrically smaller as they approach end wall means 116; similarly, the outer cylindrical surface 112 and the inner cylindrical surface 114 become diametrically smaller as they approach end wall means 116.

In the embodiment of FIGS. 6, 7, 8 and 9, the electrical box, service box or housing 78 also comprises a flange 122 at the forward or open end of body 98. The flange 122 is generally transverse to the longitudinal direction of body 98 and to the axes 104 and 106. In the preferred embodiment, the flange 122 is integrally formed with body 98 and has a forwardly disposed surface 124 and a rearwardly disposed surface 126. As depicted in FIGS. 6 and 8, the outer periphery or edge of the flange 122 is preferably in the configuration of a right rectangle; however, the practice of the invention is not limited to a flange of such configuration.

As best seen in FIG. 6, the access opening 128 and inner chamber 130 are of a generally "figure-8" configuration. That is, in the preferred embodiment, the respective outer surfaces 108 and 112 of body portions 100 and 102, as at an axial location generally next adjacent the rearward surface 126 of flange 122, are preferably defined as by respective, generally equal, radii, $R_3$, rotated about axes 104 and 106. Similarly, the access opening 128, as at its forward most portion is defined as by respective, generally equal, radii, $R_2$, rotated about axes 104 and 106; and the theoretical intersection 132 of the respective inner surfaces 110 and 114 with the inner end surface 118 is defined as by respective, generally equal, radii, $R_1$, rotated about axes 104 and 106. The differences in dimensional lengths of radii, $R_1$, $R_2$ and $R_3$ will reflect the desired thickness of, generally, walls 107 and 109 as well as the selected amount of taper of body portions 100 and 102 as to conform, generally, to good practice in the related molding process.

Still referring to FIG. 6, it can be seen that as the first radius $R_1$ is rotated about axis 104 and as the other radius $R_1$ is rotated about axis 106 the traces or loci thereof intersect as at areas 134 and 136 which, as depicted, may be somewhat arcuately blended. Similarly, as the first radius $R_2$ is rotated about axis 104 and as the other radius $R_2$ is rotated about axis 106 the traces or loci thereof intersect as at areas 138 and 140 which, as depicted, may be somewhat arcuately blended. Further, as the first radius $R_3$ is rotated about axis 104 and the other radius $R_3$ is rotated about axis 106 the traces or loci thereof intersect as at areas 142 and 144 which, as depicted, may be somewhat arcuately blended. Such intersections in effect create first and second longitudinally extending junctures, the first of which may be comprised of 142, 138 and 134 and the second of which may be comprised of 144, 140 and 136.

The axial or longitudinal length of chamber 130 and main body 98 are such as to be sufficient to receive therein, as generally practiced in the prior art, an associated electrical device such as, for example, an electrical outlet assembly or an electrical switch assembly. Further, the transverse space between the inner wall surfaces 110 and 114 at their junctures 134 and 138, at the left side of FIG. 6, and their junctures 136 and 140, at the right side of FIG. 6, is of a sufficient width or distance to accommodate the insertion therebetween of an associated electrical device such as, for example, an electrical outlet assembly or an electrical switch assembly.

Figure 9:
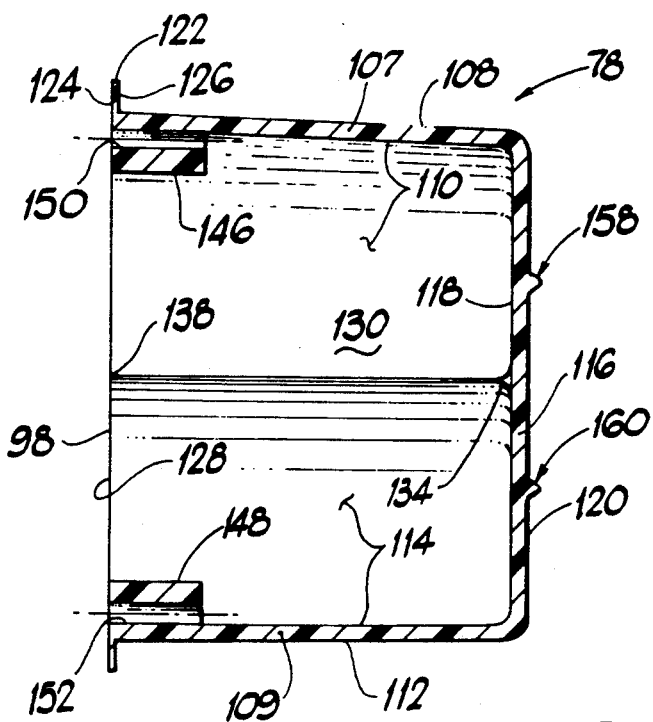
FIG. 9 is a cross-sectional view taken generally on the plane of line 9—9 and looking in the direction of the arrows.

Referring in particular to FIGS. 6, 7 and 9, the electrical box or housing means 78 is preferably provided with integrally formed boss-like portions 146 and 148 with such, in turn, being provided with passage means 150 and 152 which may or may not be internally threaded. In the preferred embodiment passages 150 and 152 are generally parallel to axes 104 and 106 and as to have the respective axes of passages 150 and 152 be generally coplanar with axes 104 and 106. With additional reference to FIG. 4, passages or openings 150 and 152 are effective for respectively receiving securing screws 88 and 90 for securably attaching the associated electrical device, depicted as being an electrical outlet assembly 86, to the box or housing means 78. Generally, if the passages or openings 150 and 152 are not internally threaded, the screws 88 and 90, as is generally well known in the art, will form an internal thread portion in such passages 150 and 152 sufficient to hold the associated electrical device, as 86, assembled to the housing 78. Many prior art electrical devices, as for example, electrical switch assemblies and electrical outlet assemblies comprise a mounting structure which, in turn, has apertures formed therethrough which operatively receive mounting screws, as 88 and 90 (FIG. 4). Generally, the industry has established standards and one of such standards is that such apertures (for accepting said mounting screws) be spaced from each other as to have the centerline-to-centerline distance be in the order of 3.25 inches (8.26 cm.). Accordingly, in the preferred embodiment of the invention the centerline-to-centerline distance of passages or openings 150 and 152 would be in the order of 3.25 inches (8.26 cm.).

Figure 14:
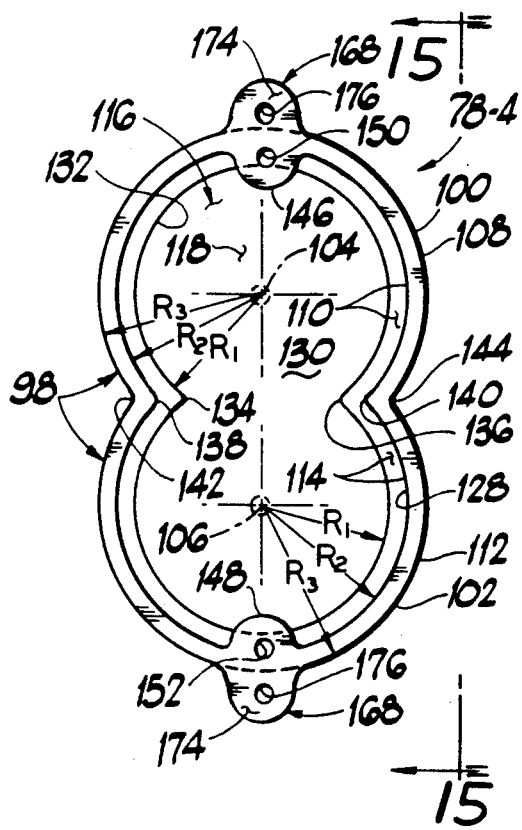
FIG. 14 is a view similar to that of FIG. 6 and illustrating another embodiment of the invention.

Further, in the preferred form of the embodiment of FIGS. 6, 7, 8 and 9, a plurality of clearance apertures 154 and 156 are formed through the flange 122 whereby securing means, such as nails and/or screws (as at 82 and 84 of FIG. 4) may be accepted for securing the flange 122 and the entire box or housing 78 to the associated wall facing as at 76 of FIG. 14.

Figure 10:
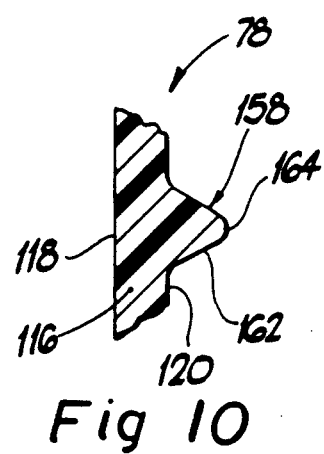
FIG. 10 is an enlarged fragmentary portion of the structure shown in FIG. 9.

Referring to FIGS. 6, 7, 8, 9 and 10, the preferred embodiment of housing 78 is illustrated as comprising a pair of projections 158 and 160 carried as by the rear wall 116 and each projecting rearwardly of rear wall outer surface 120. Each of the projections 158 and 160, as typically illustrated in enlarged scale in FIG. 10, is preferably comprised of an outer generally conical surface 162 terminating as in a point-like or near point-like end 164. Further, the respective axes of projections 158 and 160 are in respective general alignment with axes 104 and 106 as to thereby place the centers of the projection tips 164—164 at a distance generally equal to the distance between axes 104 and 106. In the preferred embodiment projections 158 and 160 are integrally formed with rear end wall 116. However, such projections 158 and 160, or their functional equivalents, could be separate members suitably secured to and carried by the wall 116 in relative locations already described.

Figure 11:
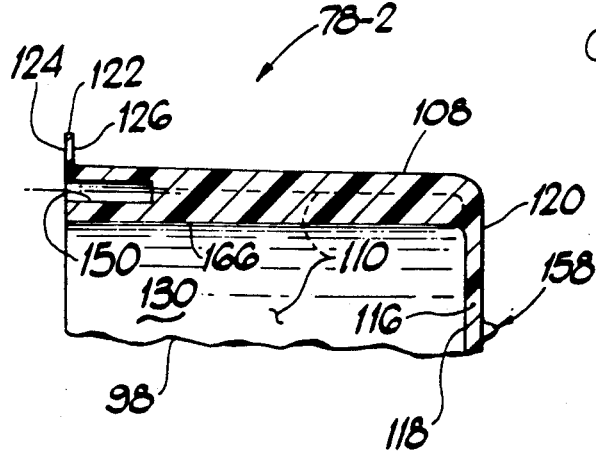
FIG. 11 is a fragmentary cross-sectional view of a modified embodiment of the structure shown in FIGS. 6, 7 and 9.

FIG. 11 illustrates, in fragmentary cross-sectional view, a modification of the invention as disclosed in FIGS. 4–10. Only that amount of such modification is shown as is necessary to illustrate the difference between the modification of FIG. 11 and FIGS. 4–10. In FIG. 11, all elements which are like or similar to those of FIGS. 4–10 are identified with like reference numbers except that for ease of referral the modified embodiment of FIG. 11 is designated 78-2. In FIG. 11, instead of the relatively short bosses 146 and 148, such are replaced by long fully extending protuberances as typically depicted at 166. The axial end view of such protuberance 166 could be generally as depicted by boss 146 as viewed in FIG. 6. In the embodiment of FIG. 11, a second protuberance functionally equivalent to that of 166 would replace the oppositely disposed boss 148 of FIGS. 6, 7 and 9.

Figure 12:
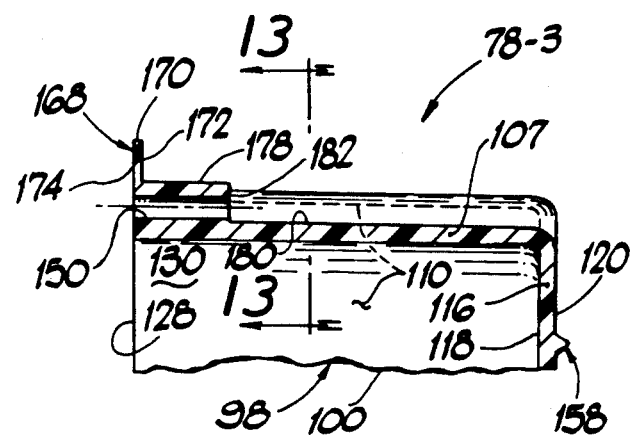
FIG. 12 is a fragmentary cross-sectional view of another modified embodiment of the structure shown in FIGS. 6, 7 and 9.
Figure 13:
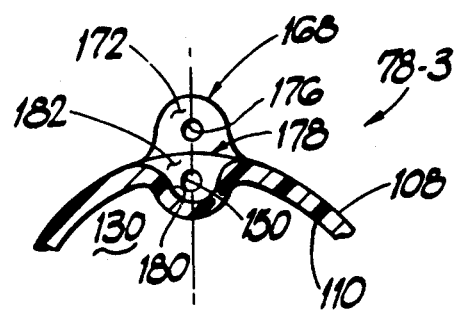
FIG. 13 is a fragmentary cross-sectional view taken generally on the plane of line 13—13 of FIG. 12 and looking in the direction of the arrows.

FIGS. 12 and 13, each in fragmentary cross-section, illustrate a further modification of the invention as disclosed in FIGS. 4–10. Only that amount of the modification of FIGS. 12 and 13 is shown as is necessary to illustrate the difference between the embodiment of FIGS. 12 and 13 and the embodiment of FIGS. 4–11. In FIGS. 12 and 13, all elements which are like or similar to those of any of FIGS. 4–11 are identified with like reference numbers except that for ease of referral the modified embodiment of FIGS. 12 and 13 is designated 78-3.

Instead of a full flange 122 extending generally laterally from and about the entire opening 128 as in FIGS. 6, 7 and 8, the embodiment of FIGS. 12 and 13 provides flange portions or tab or ear-like portions, preferably integrally formed, extending generally away from the open end of the main body 98. As typically illustrated in FIGS. 12 and 13 each of the ear or flange portions 168 is comprised of a relatively small body portion 170 integrally formed with the main body 98 and having a relatively rearwardly disposed surface 172 and a relatively forwardly disposed surface 174 which may be coplanar with the forward open end of the housing main body 98. Each of the tabs or ears 168 has a hole 176 formed therethrough which, respectively, perform the functions of holes 154 and 156 of flange 122 of FIGS. 6 and 8. For purposes of general orientation, the tab or ear 168 shown in FIGS. 12 and 13 may be considered as being the upper mounting tab or flange portion generally in alignment with the plane of axes 104 and 106; the other tab or ear (not shown) would then be considered as being the lower mounting tab or flange portion also in general alignment with the plane of axes 104 and 106.

The embodiment of FIGS. 12 and 13 illustrates a further modification. That is, instead of relatively short bosses 146 and 148 formed generally inwardly of the main body 98 as illustrated, for example, in FIG. 9, the embodiment of FIGS. 12 and 13 may be considered as having relatively short bosses formed generally outwardly of the main body 98 with a trough-like indentation, formed in the related body portion and generally aligned with the respective boss. Typically, each such boss 178 is relatively axially short, as viewed in FIG. 12, and resembles, for example, boss 146 of FIGS. 6, 7 and 9. When axially viewed from a point forwardly of the boss 178, it would have a configuration as depicted by boss 146 of FIG. 6. The wall 107, of body portion 100, is curled generally inwardly and then outwardly to form, as in cross-section, a trough like portion 180 in which the rearward face 182 of boss 178 can be seen. A boss and a trough, the mirror images of boss 178 and trough 180 would be formed at the bottom (not shown) of the main body 98 of box or housing means 78-3.

Figure 15:
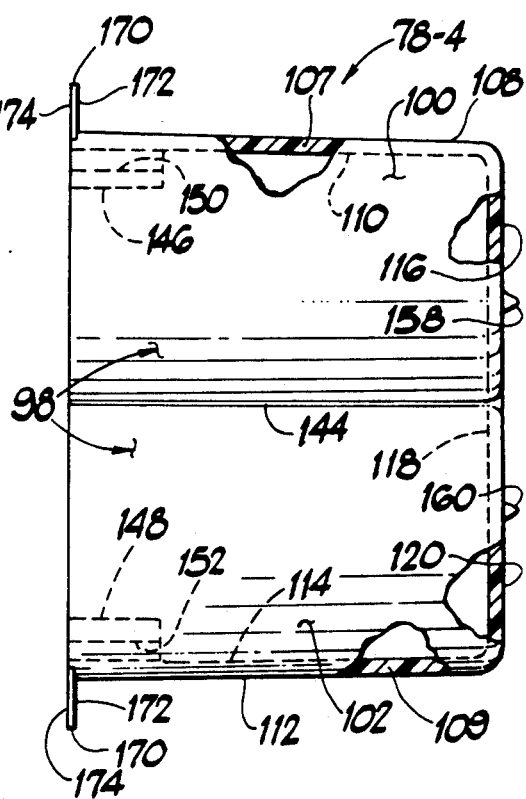
FIG. 15 is a view taken generally on the plane of line 15—15 of FIG. 14 and looking in the direction of the arrows.

FIGS. 14 and 15 illustrate still another embodiment of the invention. In FIGS. 14 and 15, all elements which are like or similar to those of any of FIGS. 4–13 are identified with like reference numbers except that for ease of referral the embodiment of FIGS. 14 and 15 is designated 78-4.

In comparing the embodiment of FIGS. 14 and 15 with that of, for example, FIGS. 6, 7, 8, 9 and 10, it can be seen that, in the main, the difference therebetween resides in the embodiment of FIGS. 14 and 15 not having flange means fully surrounding the opening 128 as does the embodiment of FIG. 6. In the embodiment of FIGS. 14 and 15 only partial flange means 168—168 are provided and such, as previously discussed with regard to FIGS. 12 and 13, are preferably integrally formed with main body 98.

Figure 16:
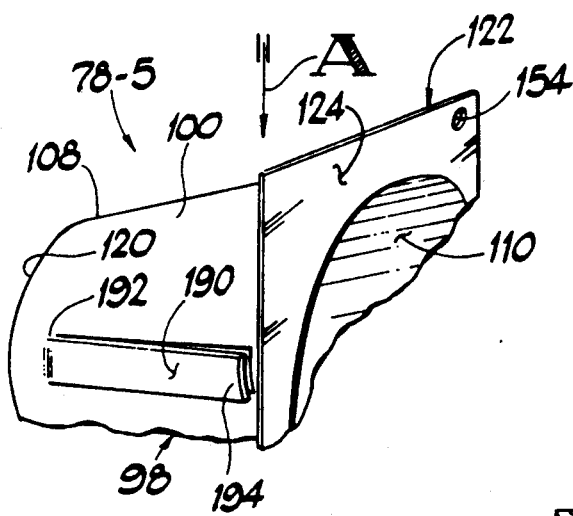
FIG. 16 is a fragmentary perspective view of, for example, the electrical box or housing of FIG. 6 and illustrating further contemplated elements thereof.
Figure 17:
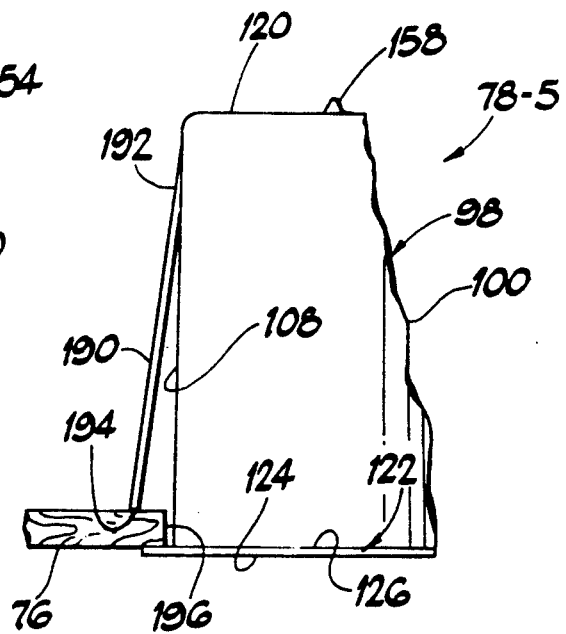
FIG. 17 is a fragmentary elevational view taken generally in the direction of arrow "A" of FIG. 16 and depicting the electrical box or housing operatively secured to a wall portion shown in cross-section.

FIGS. 16 and 17 illustrate a further modification of the invention. In order to illustrate the modification only a portion of the electrical box or housing of FIGS. 6, 7, 8 and 9 is shown in that such is sufficient to disclose the modification. In FIGS. 16 and 17 all elements which are like or similar to those of FIGS. 4–9 are identified with like reference numbers except that for ease of referral, the modified embodiment of FIGS. 16 and 17 is designated 78-5.

Referring in greater detail to FIGS. 16 and 17, one of a plurality of deflectable arm or abutment means is shown at 190 being carried as by the main body 98 of the housing 78-5. Such abutment member 190 has its generally rearward end or portion 192 operatively secured to housing portion 100 while the opposite end 194 is normally spaced or swung away from the outer surface 108 of body portion 100. As the electrical service box 78-5 is inserted into a cooperating opening 196, as within a wall facing 76, the abutment member or arm 190 first deflects toward the housing portion 100 until it passes through the opening 196 whereupon the end 194 of abutment arm again swings out to engage the rear or inner surface means of the wall panel 76. This can then, in cooperation as with flange means 122, hold the electrical service housing or box 78-5 in assembled condition to the wall panel 76. It is to be noted that even though only one such abutment means or arm 190 is shown, in the preferred arrangement, a plurality of abutment arms, functionally equal to 190, would be provided. That is, a first abutment member 190 could be located on body portion 100 as depicted, a second abutment member could be located on body portion 100 as at the diametrically opposite side thereof, and third and fourth abutment members could be similarly located on the cooperating body portion 102. As should now be evident, it is not necessary to employ a fully circumscribing flange means as 122 in combination with such abutment means; partial or tab-like flange means, as for example, 168—168 would be adequate.

The abutment member or means 190 (as well as others used in combination therewith) may be formed: (a) as a generally cut-out portion from the adjacent body portion as 100; (b) as a separate member mechanically secured at one end to the body portion as 100; or (c) as a separate member secured at one end to the body portion, as 100, as by a suitable adhesive, chemical fusion and/or sonic welding.

FIG. 18 may be considered as an enlarged fragmentary portion of the body portions of any of the embodiments of FIGS. 4–17. In FIG. 18 all elements which are like or similar to any of FIGS. 4–17 are identified with like reference numbers except that for ease of referral the modified embodiment of FIG. 18 is designated 78-6. Only that much of the modified embodiment, of FIG. 18, is shown as is necessary to describe the modification contemplated.

Referring in greater detail, FIG. 18 depicts a plurality of knock-out or break-out windows or portions. More particularly, body portion 100 is shown with a break-out portion or window arrangement 200 comprising a generally circular or disk-like body 202 generally defined as by a plurality of arcuate segments 204, 206, 208 and 210. The arcuate segments 204, 206, 208 and 210 may be very narrow slots formed through the wall 107 or may be grooves formed in the wall 107 to a depth wherein only a comparatively thin cross-section of wall 107 material remains thereby making such thin cross-sectional material relatively frangible. Also, generally circularly interspersed with the segments 204, 206, 208 and 210 are connecting portions 212, 214, 216 and 218, which may have a cross-sectional thickness that of the wall 107, which operatively interconnect the wall 107 to the body member 202 thereby effectively assuring that the member 202 remains in its depicted position until and if the member 202 is intentionally forcibly broken-out. If the member 202 is intentionally broken-out, a clearance opening or window is thereby provided through which electrical wires and/or cables may be passed as for connection to the electrical device operatively carried by the housing or service box 78-6. The segments 204, 206, 208 and 210 may be formed as during the molding of the housing 78-6 or may be subsequently formed as by, for example, a suitable cutting tool.

FIG. 18 also depicts a second break-out portion or window arrangement 220 comprising elements as those previously discussed as comprising the arrangement 200. All elements of the window arrangement 220 which are like or similar to those of 200 are identified with like reference numbers. Only two of such break-out window arrangements are shown; however, it is contemplated that additional functionally equivalent break-out window arrangements may be provided as on the same sides of body portions 100 and 102, and/or the diametrically opposite sides of body portions 100 and 102, and/or the rear wall 116. Further, it should be made clear that if in the practice of the invention a break-out window arrangement is employed, such need not be of the configuration depicted at 200 and 220 of FIG. 18. Other arrangements are also employable and U.S. Pat. No. 3,895,732, for example, illustrates one of such other arrangements.

FIGS. 19 and 20 illustrate one form of tool means employable in the practice of the invention. Referring in greater detail to FIGS. 19 and 20, the tool means 222, preferably formed of metal such as steel, is depicted as comprising a body-like portion 224 with a handle portion 226 extending therefrom. The body portion 224 carries two projections 158-2 and 160-2 which may be formed directly from body 224 and which, having their center distance generally equal to the center distance of projections 158 and 160, are respectively functionally equivalent to projections 158 and 160. Projections 158-2 and 160-2, also, may be of a conical configuration having respective tips 164-2.

As already indicated, none of the service boxes or housings 78-2, 78-3, 78-4, 78-5, 78d or 78-6 of the invention need to include projections 158 and 160; however, the inclusion of projection means 158 and 160 is preferred.

In practicing the method of the invention, let it be assumed that the inventive service box 78, having projections 158 and 160, is to be installed in a wall panel. In such a situation, the projections 158 and 160 of the service box or housing 78 may be employed as locators or markers. That is, since projections 158 and 160 are respectively generally aligned with axes 104 and 106, with such axes also serving as the centers for the arcuate outer surfaces of body portions 100 and 102, such projections 158 and 160 may then be employed for creating locating points or marks on the wall panel into which the housing 78 is to be placed. This can be done by placing the housing 78 against the wall panel, as for example fragmentarily depicted at 228 of FIG. 21, as to have the points or tips 164—164 of projections 158 and 160 against the outer surface 230 of wall panel 228. The points or tips 164—164 may be provided with a colored transfer medium so that the mere act of touching the tips 164—164 against the outer surface 230 of wall panel 228 will result in corresponding colored marks or locators being applied to the outer surface 230, or, the forward end of the housing 78 may be relatively lightly struck so as to thereby cause the projections 158 and 160, and their respective tips 164—164, to create correspondingly located marks or indentations, employable as locators, in the outer surface 230 of wall panel 228.

Let it now be assumed that the housing 78 has been thusly applied to and against outer surface 230 and that as a consequence thereof locating marks 232 and 234 have been formed on or into surface 230 by the projections 158 and 160.

Following that, a suitable appliance as, for example, an electrically driven drill unit 236, provided with a cup-like hole cutter 238, preferably with a cooperating central lead member or portion 240, employs such locating marks 232 and 234 for cutting a pair of holes through the wall panel 230. More particularly, mark 232 may be first employed as the center or axis of a first hole to be cut. That is, the appliance 236, hole cutter 238 and lead portion 240 are brought against the outer surface 230 of wall panel 228, generally along depicted axis 242, causing the tip of the lead portion 240 to engage mark or locator 232 and there start its progress through the wall panel 228. Shortly after the lead portion thusly engages mark 232, the hole cutter 238 engages the outer surface 230 and starts to cut a first hole, depicted in phantom line at 244, with such cutting continuing until the hole 244 is formed through the wall panel 228.

The hole cutter 238 is then withdrawn from the then formed hole 244 and the process repeated with respect to mark or locator 234. It should be noted that, as generally illustrated in FIG. 21, when the second hole, depicted in phantom line at 246, is being formed by the hole cutter 238, portions of the patterns of holes 244 and 246 overlap as at and between points 248 and 250. Consequently, when the cutting of the second hole is completed (whether it be 244 or 246) the result is that instead of two distinct, separate and spaced holes, only one passage exists through the wall panel 228 and that such one passage has an outer periphery defined as by a path starting from point 248 and progressing generally upwardly and then downwardly along phantom line 244 to point 250, and, from there continuing downwardly and then upwardly along phantom line 246 until returning to point 248. Such single passage, as it should now be apparent, when viewed in general alignment therewith, has the appearance of a figure "8" and is capable of receiving therein the main body 98 and body portions 100 and 102 of housing 78 for mounting in wall panel 228 with, for example, body portion 100 being primarily peripherally contained by what was the upper hole 244 and body portion 102 being primarily peripherally contained by what was the lower hole 246 while junctures 142 and 144 would be respectively juxtaposed to the hole intersections containing points 248 and 250. Such single passage as described with reference to FIG. 21 is generally depicted in and identified at 80 of FIG. 4.

It should now be apparent that the invention provides both apparatus and method which enables the comparatively rapid installation of an electrical service box or housing, as into an existing wall panel and the like, as compared to the prior art. By employing teachings of the invention, there is no need for first locating and drilling a pair of pilot-like holes, as illustrated in and described with reference to FIG. 3, nor is there a need to then use a saw, first inserted into the pilot-like holes and cut in two directions from each of the pair of pilot-like holes, as also described with reference to FIG. 3, in order to form a service box receiving hole (whether square or rectangular) in the existing wall panel.

The tool means 222 of FIGS. 19 and 20 may be employed for creating the marks or locators, as 232 and 234, even in those situations wherein the electrical box or housing of the invention, to be placed in the wall panel, is of the type not including projections 158 and 160. In using the tool means 222 the projections 158-2 and 160-2 may be held, as by handle portion 226, against the surface 230, of a wall panel 228 and then striking the body portion 224 in the direction of the wall panel.

It should be understood that many of the modifications and/or embodiments disclosed by FIGS. 4-18 may be employed in varying combinations. For example, the embodiment of FIGS. 6-9 may be modified: (a) in accordance with any of the modifications of FIGS. 12 and 13; (b) in accordance with the modification of FIG. 11; (c) in accordance with the modification of FIGS. 16 and 17; or (d) in accordance with the modification of FIG. 18; and, in view of the teachings herein, appropriate combinations thereof. The possibility of employing various ones or combinations of such modifications in the embodiment of FIGS. 14 and 15 similarly exists.

Further, additional modifications are also contemplated. For example, it is contemplated that flanges as 122 and 168 may actually be of metal and either mechanically secured to the body 98 or having such flanges as inserts during the process of molding the body 98.

Figure 22:
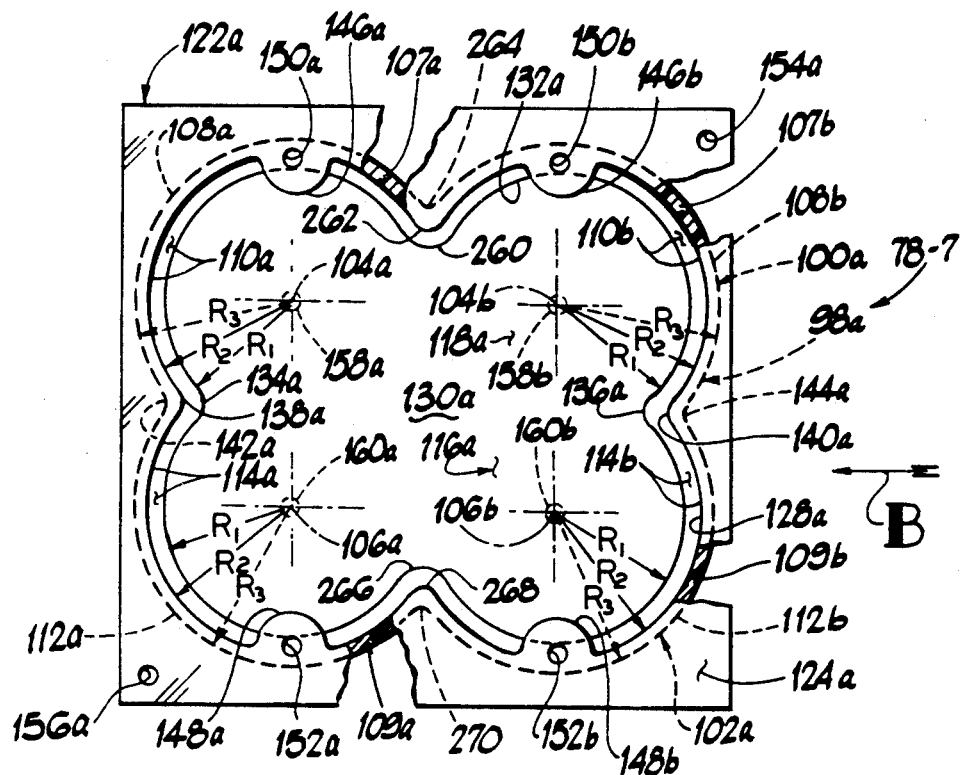
FIG. 22 is a front elevational view, similar for example to the view of FIG. 6, depicting an electrical box or housing for accommodating, for example, two electrical outlet assemblies or two electrical switch assemblies or an electrical outlet assembly and the electrical switch assembly.
Figure 23:
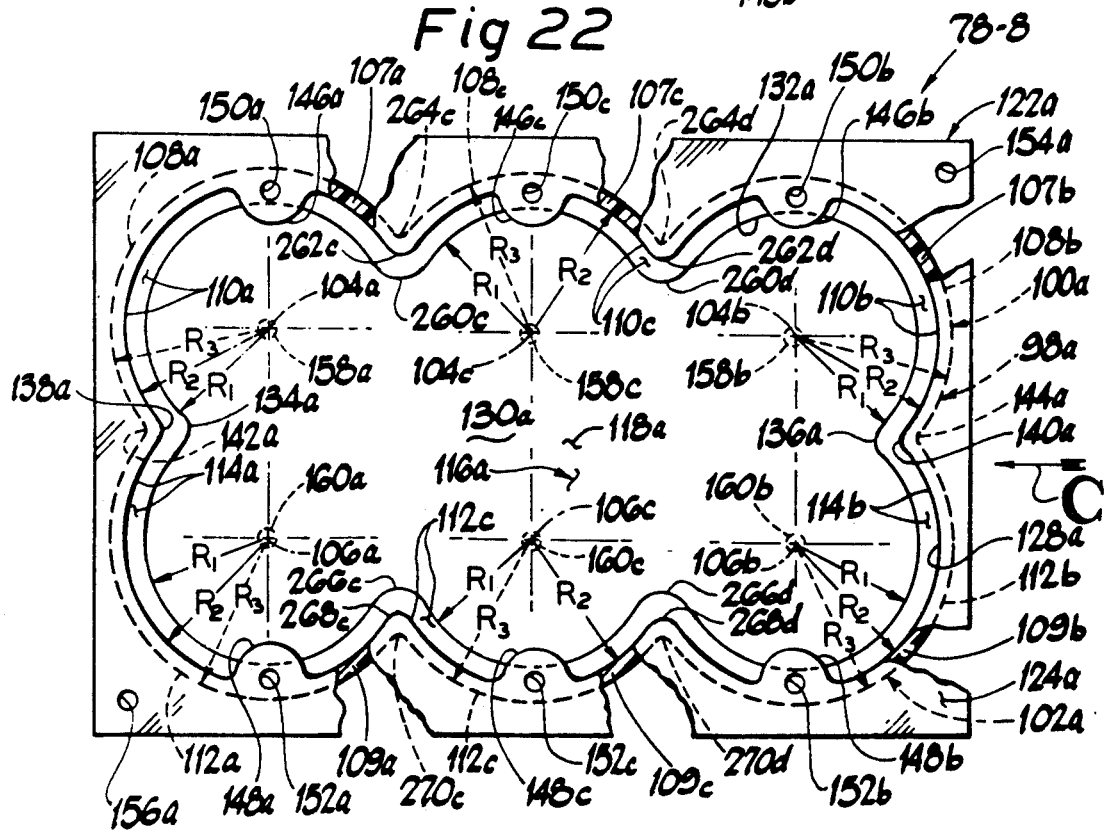
FIG. 23 is a front elevational view similar to the view of FIG. 22 and illustrating an electrical box or housing for accommodating, for example, three electrical outlet assemblies or three electrical switch assemblies or combinations thereof.

The various embodiments and modifications of the invention disclosed as in FIGS. 4-18 are directed to an electrical box or housing intended to receive what may be considered a single electrical device as, for example, the electrical outlet assembly 86 (even though it, as an assembly, provides dual outlets) of FIG. 4 or a single electrical switch assembly. However, the teachings already presented apply equally well to what may be called gang-type electrical boxes or electrical housings wherein a single electrical box or housing serves to contain a plurality of electrical devices which may comprise, for example, a plurality of electrical outlet assemblies or a plurality of electrical switch assemblies or combinations thereof. FIGS. 22 and 23 illustrate but two of such gang electrical boxes or housings, employing teachings of the invention, wherein the embodiment of FIG. 22 is intended to house two electrical devices while the embodiment of FIG. 23 is intended to house three electrical devices.

All elements in FIGS. 22 and 23 which are like or similar to the elements of the embodiments of FIGS. 4-18 will be identified by the same reference numeral provided with a suffix "a". If in FIG. 22 or FIG. 23 there are more than one element which is like or similar to the elements of FIGS. 4-18, then such additional like or similar elements are identified by the same reference numeral but provided with a differing letter suffix such as, for example, "b" or "c". Further, for ease of referral, the embodiments of FIGS. 22 and 23 are respectively designated 78-7 and 78-8.

In comparing, for example, the embodiments of FIGS. 6-10 to that of FIG. 22, it can be seen that if one were to take the right half of the view of FIG. 22 and, in effect, overlay it onto the left half of the view of FIG. 22 so that holes or passages 150a and 150b were axially aligned with each other and so that holes or passages 152a and 152b were axially aligned with each other, the resulting composite view would look like that of FIG. 6.

For purposes of description, it may be assumed that in and among all of the embodiments of the invention all: (a) radii $R_1$ are equal to each other; (b) radii $R_2$ are equal to each other and (c) radii $R_3$ are equal to each other.

Still referring to FIG. 22, it can be seen that a longitudinally extending juncture, comprised of 142a, 138a and 134a, exists and that such generally corresponds to the longitudinally extending juncture of FIG. 6 comprised of 142, 138 and 134. Also, a second longitudinally extending juncture, comprised of 144a, 140a and 136a, exists and that such generally corresponds to the longitudinally extending juncture of FIG. 6 comprised of 144, 140 and 136.

The embodiment of FIG. 22 has additional junctures. That is, as radius $R_1$ is rotated about axis 104a and as the other radius $R_1$ is rotated about axis 104b the traces or loci thereof intersect as at an area 260 which, as depicted, may be somewhat arcuately blended. As radius $R_2$ is rotated about axis 104a and as the other radius $R_2$ is rotated about axis 104b the traces or loci thereof intersect as at an area 262 which, as depicted, may be arcuately blended. As radius $R_3$ is rotated about axis 104a and as the other radius $R_3$ is rotated about axis 104b the traces or loci thereof intersect as at an area 264 which, as depicted, may be arcuately blended.

Considering the lower portion of the embodiment 78-7, as viewed in FIG. 22, as radius $R_1$ is rotated about axis 106a and as the other radius $R_1$ is rotated about axis 106b the traces or loci thereof intersect as at an area 266 which, as depicted, may be somewhat arcuately blended. As radius $R_2$ is rotated about axis 106a and as the other radius $R_2$ is rotated about axis 106b the traces or loci thereof intersect as at an area 268 which, as depicted, may be somewhat arcuately blended. As radius $R_3$ is rotated about axis 106a and as the other radius $R_3$ is rotated about axis 106b the traces or loci thereof intersect as at an area 270 which, as depicted, may be somewhat arcuately blended.

When viewed in side elevational view, as in the direction of arrow B, the embodiment 78-7 would have an appearance like that of the embodiment 78 in FIG. 7. As should now be apparent, the longitudinally extending body 98 of FIGS. 6 and 7 comprises upper and lower body portions 100 and 102 and, similarly, the longitudinally extending body 98a of FIG. 22 comprises upper and lower body portions 100a and 102a. However, in the embodiment of FIG. 22, upper body portion 100a, is comprised of two arcuate or generally cylindrical wall portions 107a and 107b which, in turn, preferably have longitudinally extending outer cylindrical surfaces 108a and 108b, respectively. Somewhat similarly, the lower body portion 102a of FIG. 22 is comprised of two arcuate or generally cylindrical wall portions 109a and 109b which, in turn, preferably have longitudinally extending outer cylindrical surfaces 112a and 112b, respectively.

The electrical box or housing 78-7 of FIG. 22 enables a plurality of electrical devices to be operatively carried thereby. For example, first and second electrical outlet assemblies, as generally depicted at 86 in FIG. 4, may be operatively secured to the housing 78-7 as by having a first of such outlet assemblies 86 received by the left side (as viewed in FIG. 22) of housing 78-7 and secured thereto as by screw 88 passing into and engaging hole 150a and a screw 90 passing into and engaging hole 152a. A second of such outlet assemblies 86 would be received by the right side (as viewed in FIG. 22) of housing 78-7 and secured thereto as by another screw 88 passing into and engaging hole 150b with another screw 90 passing into and engaging hole 152b. A cover plate, functionally equivalent to cover plate 92, would then be placed over such two electrical outlet assemblies (in the manner depicted in FIG. 4) and secured to the respective outlet assemblies as by respective screws 96 as depicted in FIG. 4.

In the preferred form of the embodiment of FIG. 22, a plurality of projections 158a, 160a, 158b and 160b are carried by the rear or end wall 116a as to be projecting rearwardly thereof in the manner already described with regard to the herein previously disclosed embodiments of the invention.

Housing 78-7 may be employed, in the manner previously discussed with reference to FIGS. 6 and 21, for locating, as onto walls and the like, marks to be employed as centers for in turn cutting appropriate holes through the wall facing. For example, referring to both FIGS. 21 and 22, if the housing 78-7 were to be installed into the wall means 228 or wall facing 230, the housing 78-7 could be struck against wall surface 230 thereby causing projection 158a to create the locating mark 232 and causing projection 160a to create the locating mark 234. However, additionally, projection 158b and projection 160b also make a second set of respective locating marks generally laterally spaced from marks 232 and 234, respectively. In cutting the hole through the wall means 228, for the housing 78-7, the process could be as that hereinbefore described with reference to FIG. 21 wherein the cutting of holes 244 and 246 was described. However, in forming the hole for receiving the housing 78-7, the hole locating and cutting process would be repeated employing the said second set of locating marks thereby cutting a second pair of holes partially depicted in dash-lines at 272 and 274. In thusly forming the additional holes 272 and 274, it should be noted that holes 272 and 274 partially overlap each other as do holes 244 and 246 and further, that hole 272 partially overlaps hole 244 while hole 274 partially overlaps hole 246 thereby resulting in a housing 78-7 receiving hole (in wall means 228) the configuration of which would be defined, collectively, by the remaining circular portions of the holes 244, 246, 272 and 274.

In the further embodiment 78-8 of FIG. 23, except as otherwise noted, all elements which are like or similar to those of FIG. 22 are identified with like reference numbers. As with the embodiment of FIG. 22, the embodiment 78-8 of FIG. 23, when viewed as in the direction of arrow C, would have the appearance of housing 78 in FIG. 7. Further, it can be seen that the left third (as viewed in FIG. 23) of housing 78-8 generally corresponds to the left half (as viewed in FIG. 22) of housing 78-7. The right third (as viewed in FIG. 23) of housing 78-8 generally corresponds to the right half (as viewed in FIG. 22) of housing 78-7. What, in the main is different between the embodiments of FIGS. 22 and 23 is that in the embodiment 78-8 an additional generally medial portion is provided whereby the housing 78-8 is able to operatively receive and carry three electrical devices. Since it has already been described in FIG. 22 how the respective longitudinally extending junctures, one comprised of 260, 262 and 264 and the other comprised of 266, 268 and 270, are formed, it should now be apparent as to how functionally similar junctures are formed in housing 78-8. Accordingly, in FIG. 23 the respective longitudinally extending junctures comprised as of 260c, 262c and 264c and comprised as of 260d, 262d and 264d may each be considered similar and/or functionally equivalent to the longitudinally extending juncture, comprised of 260, 262 and 264 of FIG. 22. Likewise, in FIG. 23 the respective longitudinally extending junctures comprised as of 266c, 268c and 270c and comprised as of 266d, 268d and 270d may each be considered similar and/or functionally equivalent to the longitudinally extending juncture, comprised of 266, 268 and 270 of FIG. 22.

Further, as should now be apparent, the longitudinally extending body 98 of FIGS. 6 and 7 comprises upper and lower body portions 100 and 102 and, similarly, the longitudinally extending body 98a of FIG. 23 comprises upper and lower body portions 100a and 102a. However, in the embodiment of FIG. 23, upper body portion 100a is comprised of three arcuate or generally cylindrical wall portions 107a, 107c and 107b which, in turn, preferably have longitudinally extending outer cylindrical surfaces 108a, 108c and 108b, respectively. Somewhat similarly, the lower body portion 102a of FIG. 23 is comprised of three arcuate or generally cylindrical wall portions 109a, 109c and 109b which, in turn, preferably have longitudinally extending outer cylindrical surfaces 112a, 112c and 112b, respectively.

The electrical box or housing 78-8 of FIG. 23 also enables a plurality of electrical devices to be operatively carried thereby. For example, first, second and third electrical outlet assemblies, as generally depicted at 86 of FIG. 4, may be operatively secured to the housing 78-8 as by having a first of such outlet assemblies 86 received by the left side (as viewed in FIG. 23) of housing 78-8 and secured thereto as by a screw such as 88 passing into and engaging hole 150a and a screw such as 90 passing into and engaging hole 152a. A second of such outlet assemblies 86 would be received by the medial portion (as viewed in FIG. 23) of housing 78-8 and secured thereto by another screw as 88 passing into and engaging hole 150c with another screw as 90 passing into and engaging hole 152c. The third of such outlet assemblies 86 would be received by the right side portion (as viewed in FIG. 23) of housing 78-8 and secured thereto by another screw as 88 extending into and engaging hole 150b with another screw as 90 extending into and engaging hole 152b. A cover plate, functionally equivalent to cover plate 92, would then be placed over such three (ganged) electrical outlet assemblies and secured to the respective outlet assemblies as by respective screws 96 as depicted in FIG. 4.

In the preferred form of the embodiment of FIG. 23, a plurality of projections 158a, 160a, 158c, 160c, 158b and 160b are carried by the rear or end wall 116a as to be projecting rearwardly thereof in the manner already described with regard to the herein previously disclosed embodiments of the invention.

Housing 78-8 may be employed, in the manner previously discussed with reference to FIGS. 6 and 21, and particularly with reference to the embodiment 78-7 of FIG. 22 along with FIG. 21, for locating as onto walls and the like, marks to be employed as centers for in turn cutting appropriate holes through the wall facing. For example, referring to both FIGS. 21 and 23, if the housing 78-8 were to be installed into the wall means or wall facing 228, the procedure would be as that described with regard to the installation of housing 78-7. That is, housing 78-8 could be struck against wall surface 230 thereby causing projections 158a, 160a, 158c, 160c, 158b and 160b to create six locating marks (two of which may be as at 232 and 234 of FIG. 21) instead of the four locating marks made with housing 78-7. The third set of respective locating marks, which would be made by projections 158b and 160b, would be generally laterally spaced of the marks (not shown) which would have been used as centers for holes 272 and 274 (FIG. 21) as when installing the housing 78-7. In cutting the hole through the wall means 228, for the housing 78-8, the process could be as that hereinbefore described with reference to FIGS. 22 and 21. However, in forming the hole for receiving the housing 78-8, the hole locating and cutting process would be repeated employing the said third set of locating marks thereby cutting a third pair of holes partially depicted in dash-lines at 276 and 278. In thusly forming the additional holes 276 and 278, it should be noted that holes 276 and 278 partially overlap each other as do holes 272 and 274 and as do holes 244 and 246. Further, it should be noted that: (a) hole 272 partially overlaps hole 244; (b) hole 274 partially overlaps hole 246; (c) hole 276 partially overlaps hole 272 and (d) hole 278 partially overlaps hole 274 thereby resulting in a receiving hole (in wall means 228) for housing 78-8 the configuration of which would be defined, collectively, by the remaining circular portions of the holes 244, 246, 272, 274, 276 and 278.

The housing 78-7 of FIG. 22 and the housing 78-8 of FIG. 23 need not be limited to the exact embodiments thereof as respectively depicted in FIGS. 22 and 23. That is, each of housings 78-7 and 78-8 may be further modified, as, for example, disclosed by any of FIGS. 11, 12, 13, 14, 15, 16, 17 and 18 and as described with reference thereto.

It is further contemplated that whether housings 78-7 and 78-8 employ flanges as 122a or as 168 (FIGS. 14 and 15) that such flanges may actually be of metal and either mechanically secured to the body 98a of housing 78-7 or body 98a of housing 78-8, or, having such flanges as inserts during the process of molding the bodies 98a.

In reviewing the various embodiments and modifications of the invention, it should be apparent that the structures comprising the embodiments and modifications may be described in varying ways. For example, looking at the views of FIGS. 4, 6, 8 or 14, it is believed clear that the body 98, of such housings, conveys the impression of a figure "8". Further, the views as presented in FIGS. 6 and 14 also clearly convey the impression that the body 98 is comprised of two body portions, 100 and 102, each of which has the appearance, in axial end view and in transverse cross-section (transverse to axes 104, 106) of the letter "C". That is, body portion 100 may be considered as a first "C" positioned as to have its opening lowermost (as viewed in either FIG. 6 or 14) while body portion 102 may be considered as a second "C" positioned as to have its opening uppermost with such openings, in effect, coinciding with each other resulting in the ends of such first and second "C"-like configurations forming the juncture 134, 138 and 142 and juncture 136, 140 and 144.

Although only a preferred embodiment and a select number of modifications of the invention have been disclosed and described, it is apparent that other embodiments and modifications of the invention are possible within the scope of the appended claims.

What is claimed is:

1. A method for installing an electrical service housing into a wall facing member comprising the steps of forming the electrical service housing to have a longitudinally extending body comprised of a plurality of longitudinally extending body portions each of a generally arcuate outer configuration when viewed in transverse cross-section of said longitudinally extending body portions, cutting a plurality of holes through said wall facing member in a manner whereby adjacent holes overlap each other thereby resulting in a receiving-hole in said wall facing member having a periphery comprised of a plurality of arcuate portions corresponding to the number of said plurality of longitudinally extending body portions, and slidably inserting said longitudinally extending body into said receiving-hole as to have said plurality of longitudinally extending body portions respectively juxtaposed to said plurality of arcuate portions of said receiving-hole.

2. A method according to claim 1 and further comprising the step of marking said wall facing member to indicate the location of centers of said holes.

3. A method according to claim 2 wherein the step of marking said wall facing member comprises the step of placing a marking tool against the surface of said wall facing member and urging said marking tool against said surface.

4. A method according to claim 2 wherein the step of forming the electrical service housing comprises the step of forming a transverse end wall carrying a plurality of outwardly extending projections, and wherein the step of marking said wall facing member comprises the step of placing said plurality of outwardly extending projections against the surface of said wall facing member and urging said plurality of outwardly extending projections against said surface.

5. A method of installing an electrical service box into a wall facing comprising the steps of forming the electrical service box to have a cross-sectional configuration having an outer peripheral portion which generally conforms to the shape of the outer configuration of a figure "8" and an inner portion of which defines a chamber for the reception of an associated electrical device, cutting first and second holes through the wall facing so that said first and second holes partially overlap each other thereby creating an opening through said wall facing having a peripheral configuration generally conforming to the shape of a figure "8", and then inserting the electrical service box into said opening as to have figure "8" peripheral configuration of said service box at least in general registry to the figure "8" peripheral configuration of said opening.

6. A method for installing an electrical service housing into a wall facing member comprising the steps of forming the electrical service housing to have a longitudinally extending body comprised of at least first second third and fourth longitudinally extending body portions each of a generally arcuate outer configuration when viewed in transverse cross-section of said longitudinally extending body portions, marking said wall facing member to indicate locations of at least first second third and fourth centers for holes to be cut through said wall facing member, wherein the step of marking said wall facing member to indicate said locations of said first, second, third and fourth centers comprises the step of locating said first, second, third and fourth centers relative to each other as to be in a generally rectilinear pattern, employing said first center for cutting a first hole about said first center and through said wall facing member, employing said second center for cutting a second hole about said second center and through said wall facing member, employing said third center for cutting a third hole about said third center and through said wall facing member, employing said fourth center for cutting a fourth hole about said fourth center and through said wall facing member, wherein the step of cutting said first, second, third and fourth holes comprises the step of making said first, second, third and fourth holes be respectively of first, second, third and fourth radii, wherein the step of marking said first and second centers includes the step of positioning said first and second centers a first distance away from each other which is less in magnitude than the sum of said first and second radii, wherein the step of marking said first and third centers includes the step of positioning said first and third centers a second distance away from each other which is less in magnitude than the sum of said first and third radii, wherein the step of marking said third and fourth centers includes the step of positioning said third and fourth centers a third distance away from each other which is less in magnitude than the sum of said third and fourth radii, wherein the step of marking said second and fourth centers includes the step of positioning said second and fourth centers a fourth distance away from each other which is less in magnitude than the sum of said second and fourth radii, wherein the step of cutting said first second third and fourth holes results in defining a receiving-hole in said wall facing member having a periphery comprised of first, second, third and fourth arcuate portions, and slidably inserting said longitudinally extending body into said receiving-hole in a manner whereby said arcuate outer configurations of said first, second, third and fourth longitudinally extending body portions are respectively juxtaposed to said first, second, third and fourth arcuate portions of said periphery of said receiving-hole.

7. A method according to claim 6 wherein the step of marking said wall facing member comprises the step of placing a marking tool against the surface of said wall facing member and urging said marking tool against said surface.

8. A method according to claim 6 wherein the step of forming the electrical service housing comprises the step of forming an end wall thereon and carrying at least first, second, third and fourth outwardly extending projections, and wherein the step of marking said wall facing member comprises the step of placing said outwardly extending projections against the surface of said wall facing member and urging said outwardly extending projections against said surface.

* * * * *

UNITED STATES PATENT AND TRADEMARK OFFICE
CERTIFICATE OF CORRECTION

PATENT NO. : 5,187,853

DATED : February 23, 1993

INVENTOR(S) : George A. Bardaville

It is certified that error appears in the above-identified patent and that said Letters Patent is hereby corrected as shown below:

Column 17, line 31 (Claim 5, line 14 thereof) between "have" and "figure" insert --- the ---.

Signed and Sealed this

Sixteenth Day of November, 1993

Attest:

BRUCE LEHMAN

Attesting Officer

Commissioner of Patents and Trademarks